United States Patent
Pursifull et al.

(10) Patent No.: US 11,220,975 B1
(45) Date of Patent: Jan. 11, 2022

(54) METHODS AND SYSTEMS FOR COMPENSATING FOR FUEL INJECTOR CLOSING TIME

(71) Applicant: Ford Global Technologies, LLC, Dearborn, MI (US)

(72) Inventors: Ross Dykstra Pursifull, Dearborn, MI (US); Joseph Thomas, Farmington Hills, MI (US); Rani Kiwan, Canton, MI (US); Ian D Campbell, Casco, MI (US); Paul Hollar, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/204,254

(22) Filed: Mar. 17, 2021

(51) Int. Cl.
  *F02D 41/40* (2006.01)
  *B60R 16/033* (2006.01)
  *F02D 41/38* (2006.01)

(52) U.S. Cl.
  CPC .......... *F02D 41/401* (2013.01); *B60R 16/033* (2013.01); *F02D 2041/389* (2013.01); *F02D 2200/0618* (2013.01)

(58) Field of Classification Search
  CPC ............. F02D 2200/101; F02D 41/401; F02D 2200/0618; F02D 2041/389; B60R 16/033
  See application file for complete search history.

(56) References Cited

U.S. PATENT DOCUMENTS

| | | | |
|---|---|---|---|
| 6,088,647 A * | 7/2000 | Hemberger | F02D 41/221 701/104 |
| 7,717,088 B2 | 5/2010 | Thomas | |
| 7,841,319 B2 | 11/2010 | Thomas | |
| 8,935,114 B2 | 1/2015 | Beer et al. | |
| 9,074,552 B2 | 7/2015 | Shibata et al. | |
| 9,494,100 B2 | 11/2016 | Rösel | |
| 9,719,453 B2 | 8/2017 | Beer et al. | |
| 10,393,056 B2 | 8/2019 | Pursifull et al. | |
| 10,760,518 B2 | 9/2020 | Pursifull et al. | |
| 2010/0108030 A1* | 5/2010 | Kusaka | F02D 41/20 123/357 |
| 2010/0176759 A1* | 7/2010 | North | F02M 53/06 318/473 |
| 2016/0177855 A1* | 6/2016 | Kusakabe | F02D 41/20 123/490 |
| 2016/0237937 A1* | 8/2016 | Kusakabe | F02D 41/402 |
| 2019/0085783 A1* | 3/2019 | Kusakabe | F02D 41/401 |
| 2019/0109534 A1* | 4/2019 | Okonogi | F02D 41/22 |
| 2020/0088122 A1* | 3/2020 | Kusakabe | F02D 41/40 |

FOREIGN PATENT DOCUMENTS

| | | |
|---|---|---|
| DE | 19700738 C1 | 4/1998 |
| DE | 102004053580 A1 | 8/2005 |
| DE | 102005018576 A1 | 11/2005 |
| DE | 102007000005 A1 | 8/2007 |

* cited by examiner

*Primary Examiner* — Joseph J Dallo
*Assistant Examiner* — Kurt Philip Liethen
(74) *Attorney, Agent, or Firm* — Geoffrey Brumbaugh; McCoy Russell LLP

(57) ABSTRACT

Systems and methods for improving accuracy of an amount of fuel injected to an engine are disclosed. In one example, timing of a fuel injector off command is adjusted according to attributes of fuel injector holding current so that a fuel injector may provide a requested fuel amount. The fuel injector off command may be adjusted according to an amount of holding current that is expected to be flowing through the fuel injector at a time when the fuel injector is commanded off.

20 Claims, 9 Drawing Sheets

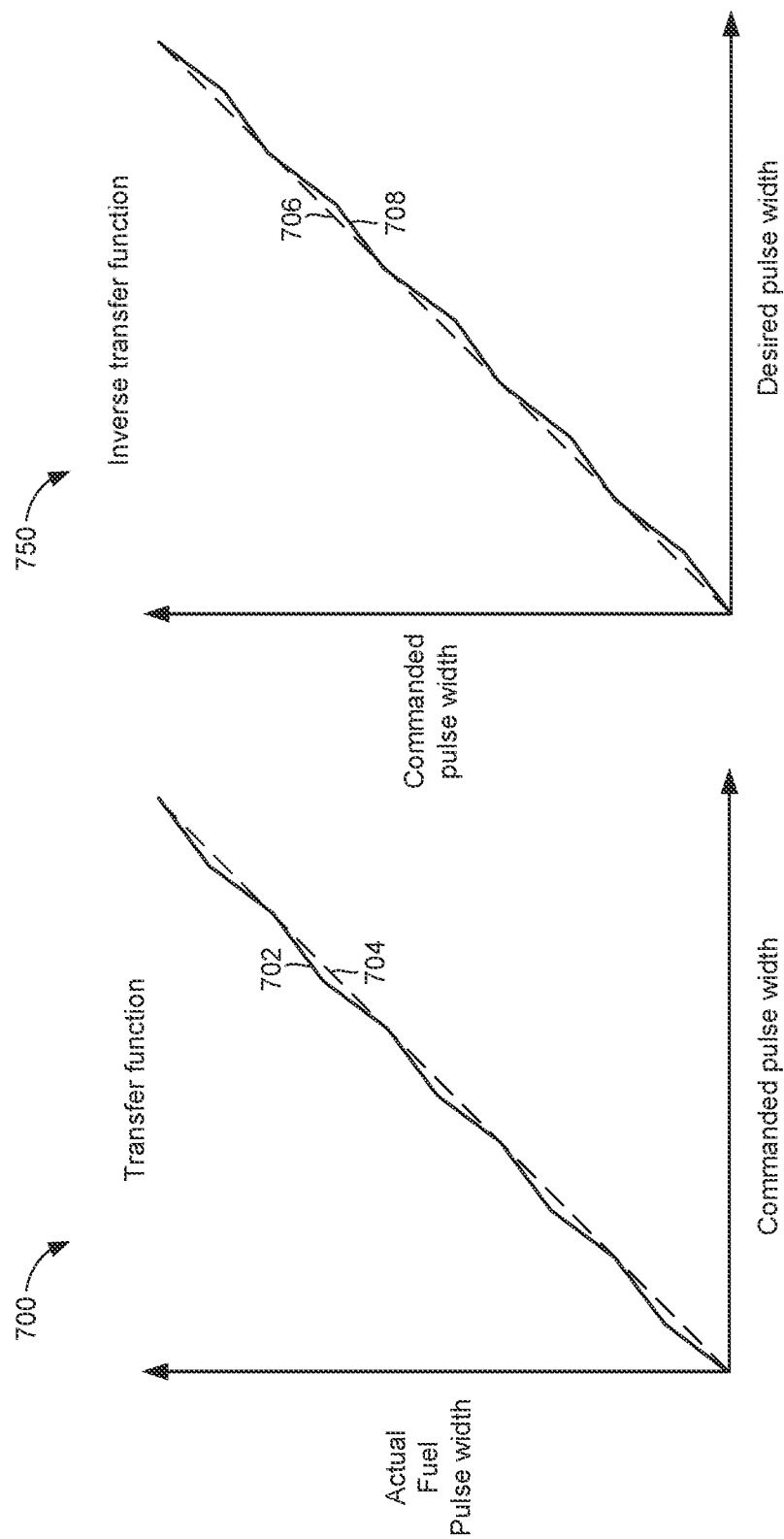

METHODS AND SYSTEMS FOR COMPENSATING FOR FUEL INJECTOR CLOSING TIME

FIELD

The present description relates to a system and methods for improving accuracy of an amount of fuel that is injected to an engine via adjusting a commanded closing time of a fuel injector. The methods may be particularly useful for direct fuel injectors.

BACKGROUND AND SUMMARY

A fuel injector may inject fuel to an engine in response to electric signals that are delivered to drive circuitry of the fuel injector. The electric signals may transition from a low level to a high level to command the fuel injector fully open so that the fuel injector may deliver fuel. The electric signals may also transition from the high level to the low level to command the fuel injector fully closed so that the fuel injector may cease supplying fuel to the engine. However, different fuel injectors may respond differently to signals that are exactly the same due to manufacturing and material variation. In addition, a single fuel injector may inject different amounts of fuel when the single fuel injector is driven by seemingly the same fuel injector commands. Therefore, it may be desirable to provide a way of operating fuel injectors that may reduce variation in the amount of fuel injected.

The inventors herein have recognized the above-mentioned disadvantages and have developed a system, comprising: a fuel injector; and a controller including executable instructions stored in non-transitory memory that cause the controller to adjust timing of a fuel injector off command in response to a period of a last period of fuel injector holding current of the fuel injector during a fuel injection event of the fuel injector.

By adjusting timing of a fuel injector off command in response to a period of a last period of fuel injector holding current of the fuel injector during a fuel injection event of the fuel injector, it may be possible to reduce fuel injection amount variation. Specifically, a fuel injection off timing or end of injection timing may be adjusted according to an amount of holding current that is expected to flow through the fuel injector at the time the fuel injector is commanded off. The amount of holding current flowing through the fuel injector may be indicative of an amount of time that the fuel injector will remain open after it has been commanded off. Therefore, by adjusting injector off timing according to an amount of holding current flowing through the fuel injector, it may be possible to inject and amount of fuel that is closer to a requested or desired amount of fuel to inject.

The present description may provide several advantages. Specifically, the approach may reduce variation of an amount of fuel injected via a fuel injector. Further, the approach may reduce the influence of nominal fuel injector operating conditions (e.g., temperature and battery voltage) on fuel injection variation. In addition, the approach may be implemented with existing system hardware.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 7A and 7B show plots of transfer functions or relationships between commanded fuel injector pulse width and actual fuel injector pulse width;

DETAILED DESCRIPTION

Figure 1:
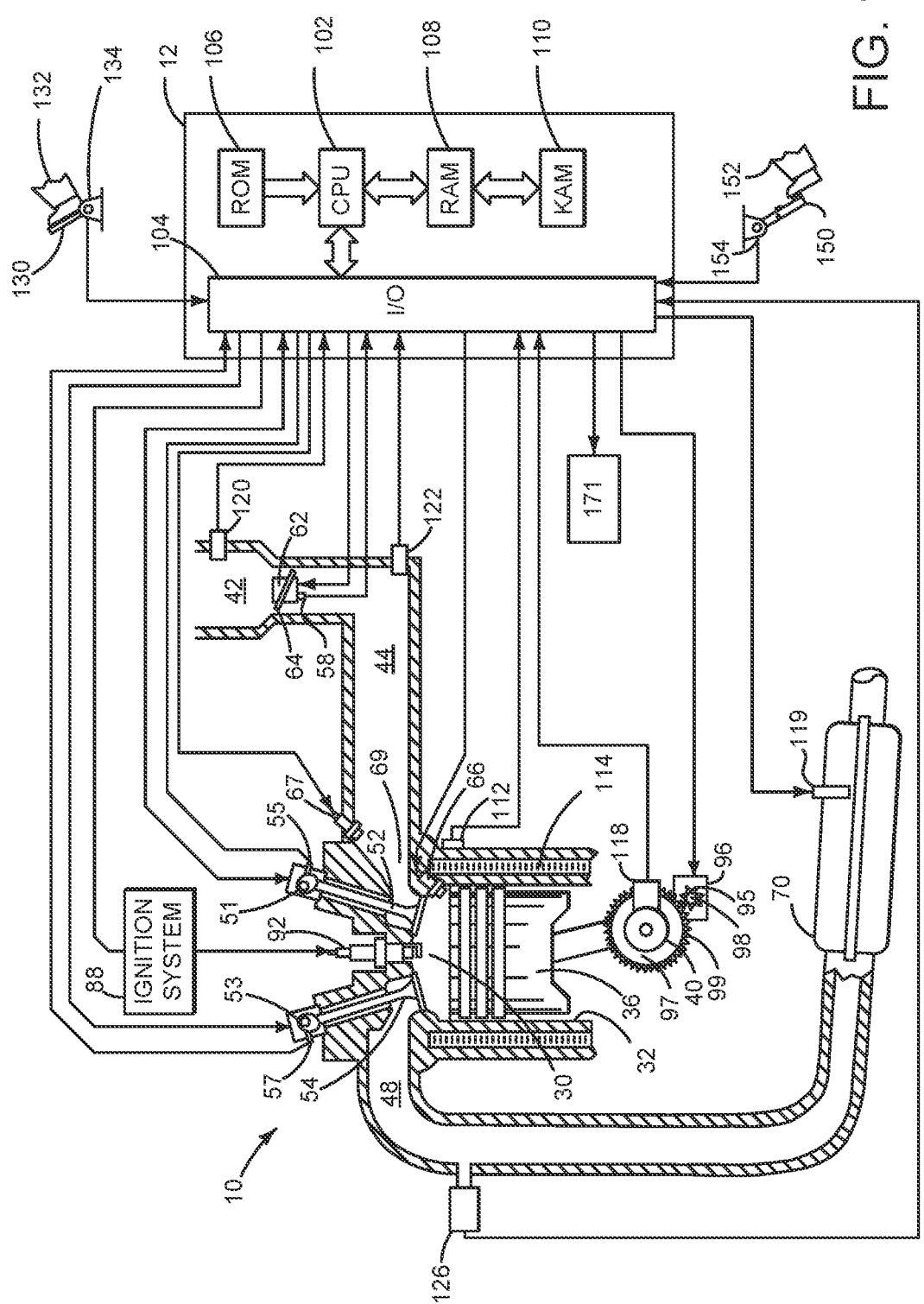
FIG. 1 is a schematic diagram of an engine.
Figure 2:
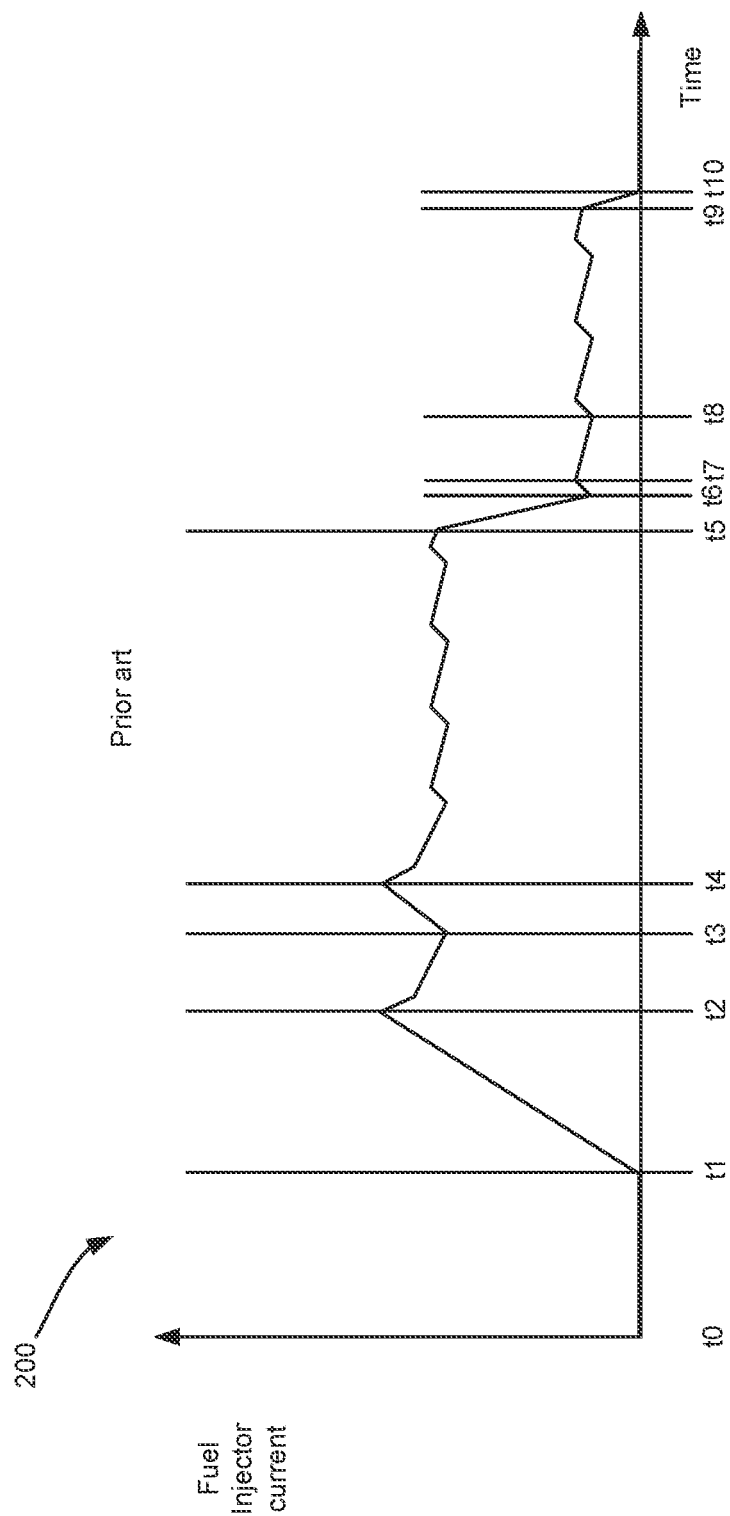
FIG. 2 shows electric current flowing through a fuel injector according to a prior art method.
Figure 3:
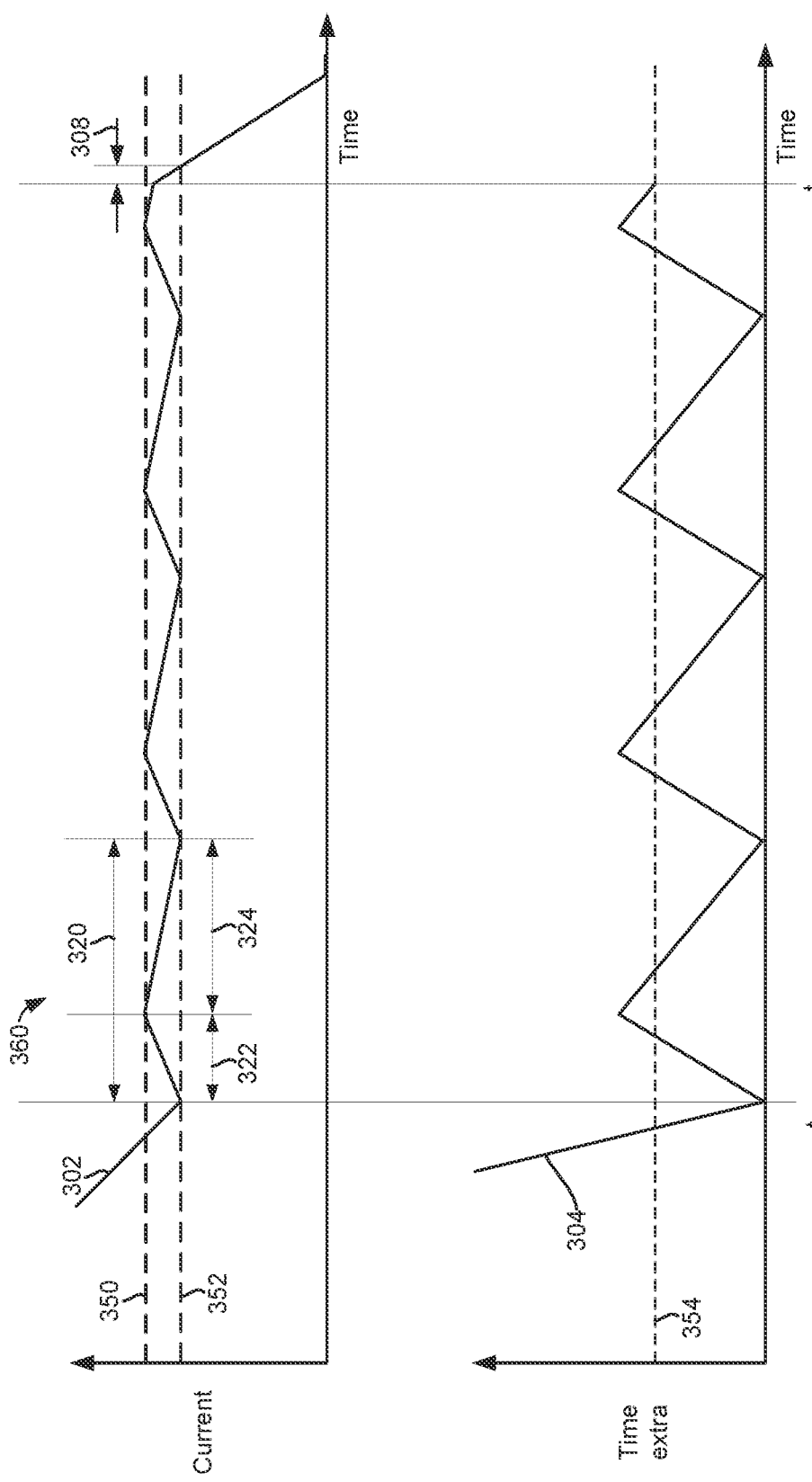
FIGS. 3-5 show attributes of fuel injector holding current.
Figure 4:
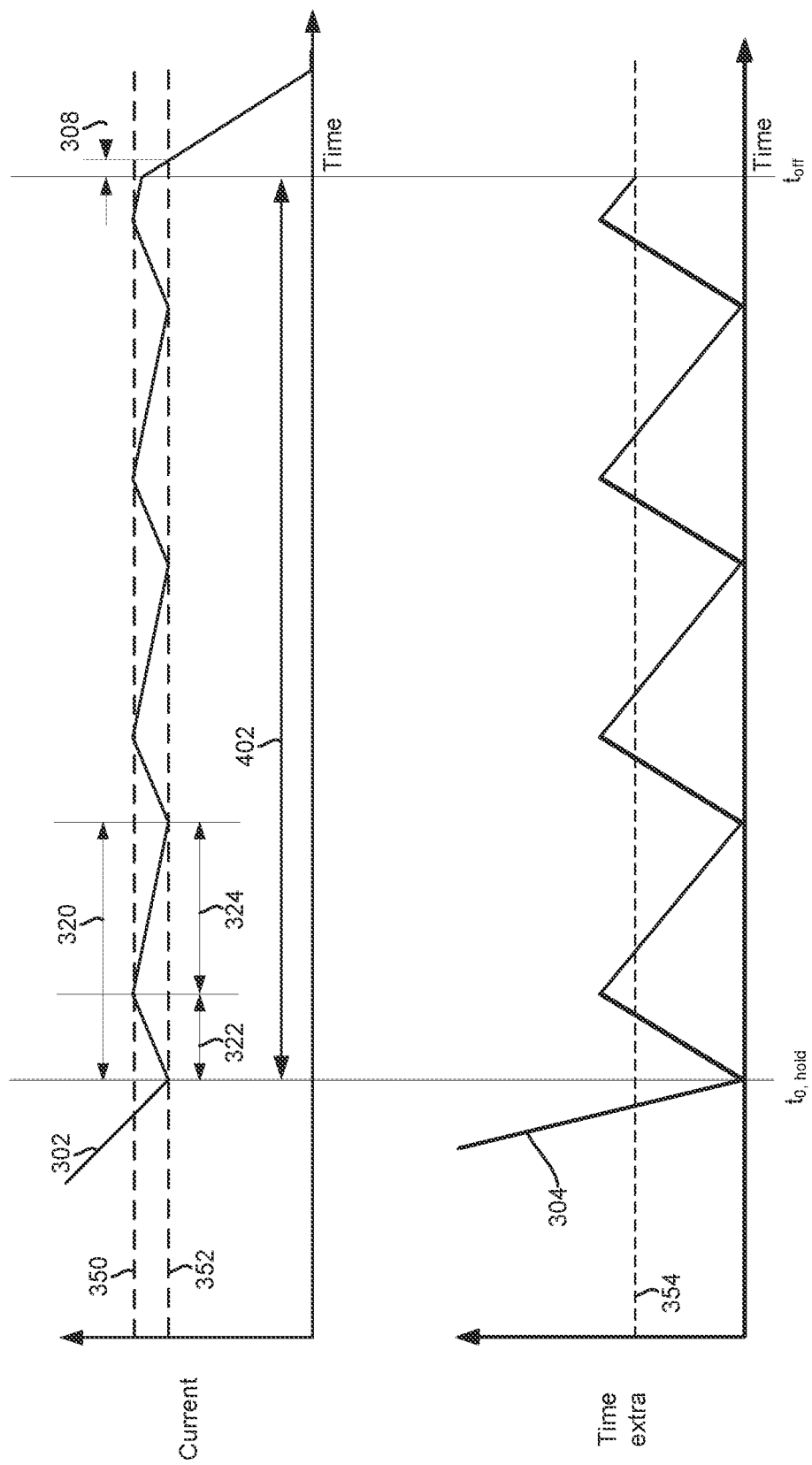
Figure 5:
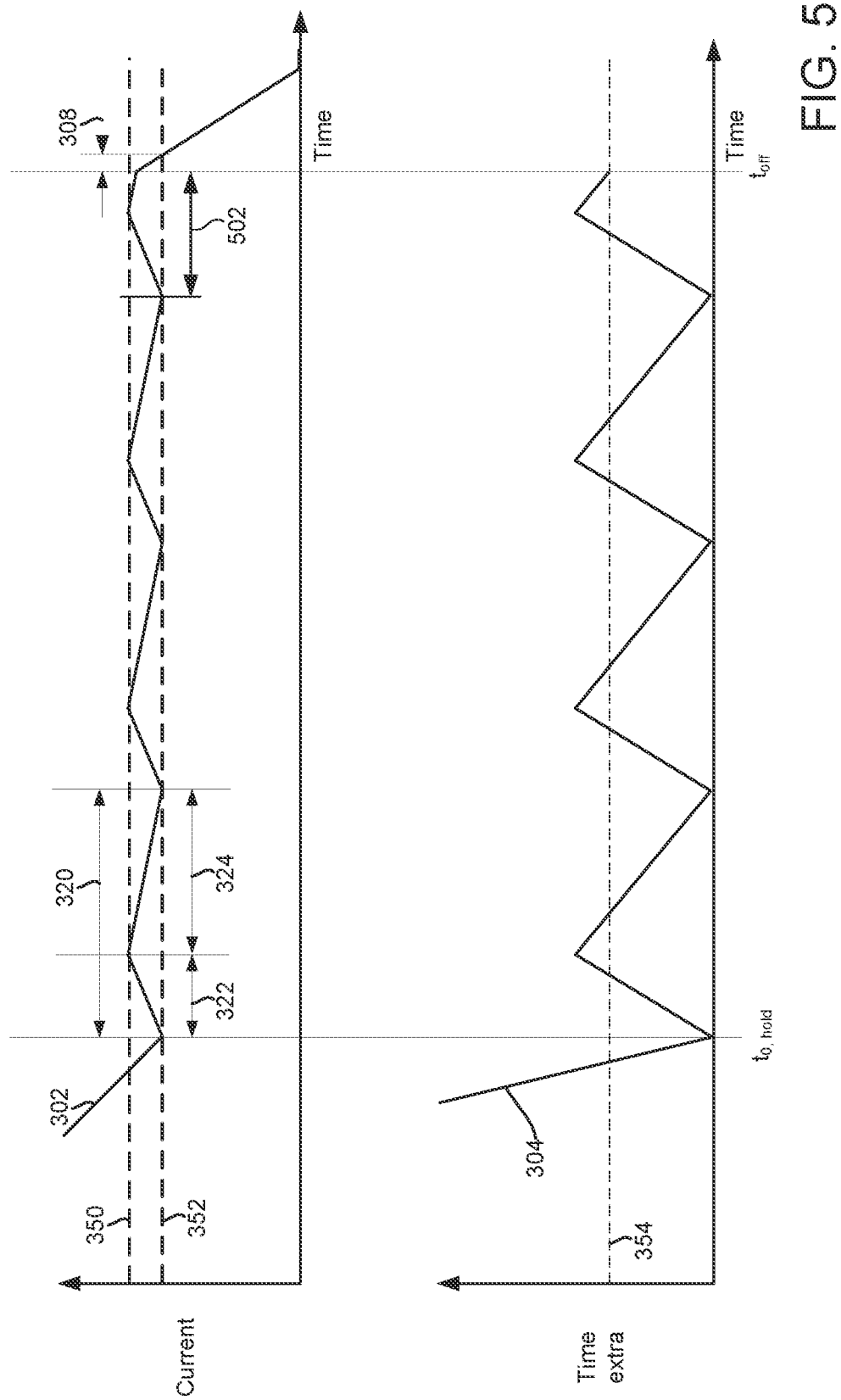
Figure 6A:
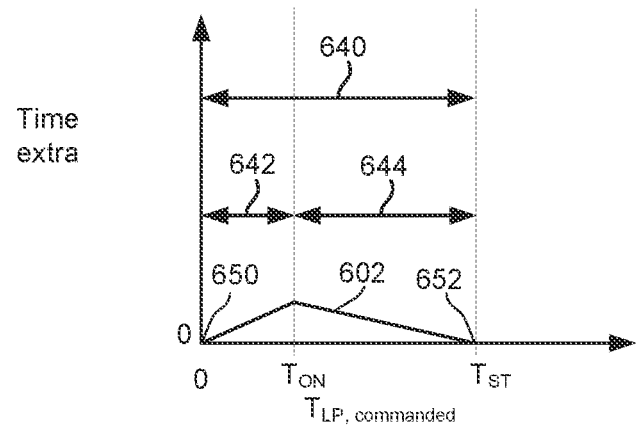
FIGS. 6A-6C show how fuel injector holding current in a last period of fuel injector holding current during a fuel injection event may effect timing of a fuel injector off command.
Figure 6B:
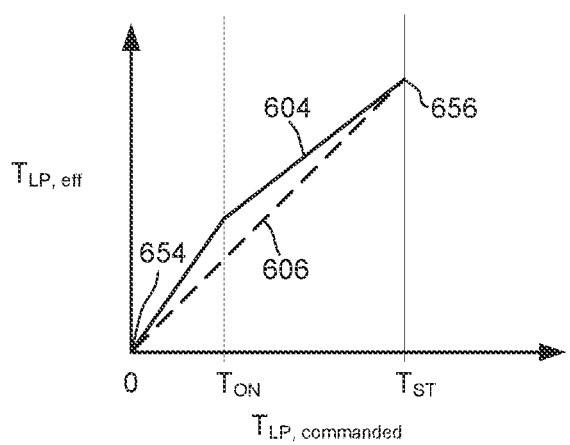
Figure 6C:
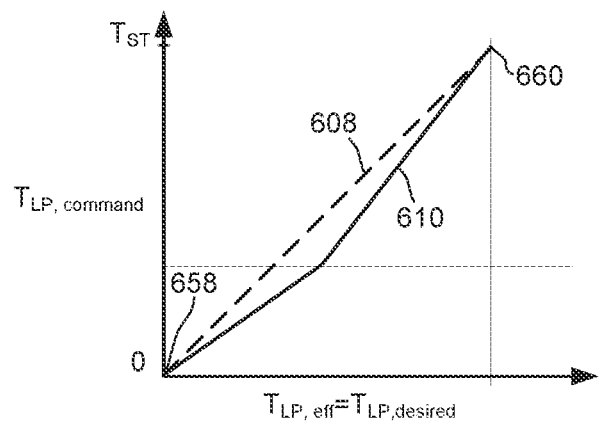
Figure 8:
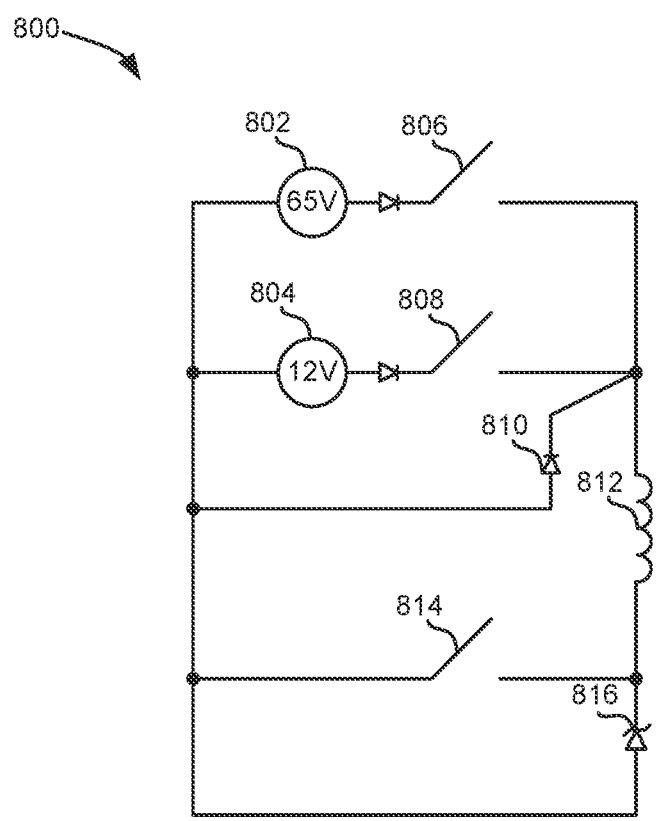
FIG. 8 shows an example circuit for operating a fuel injector.
Figure 9:
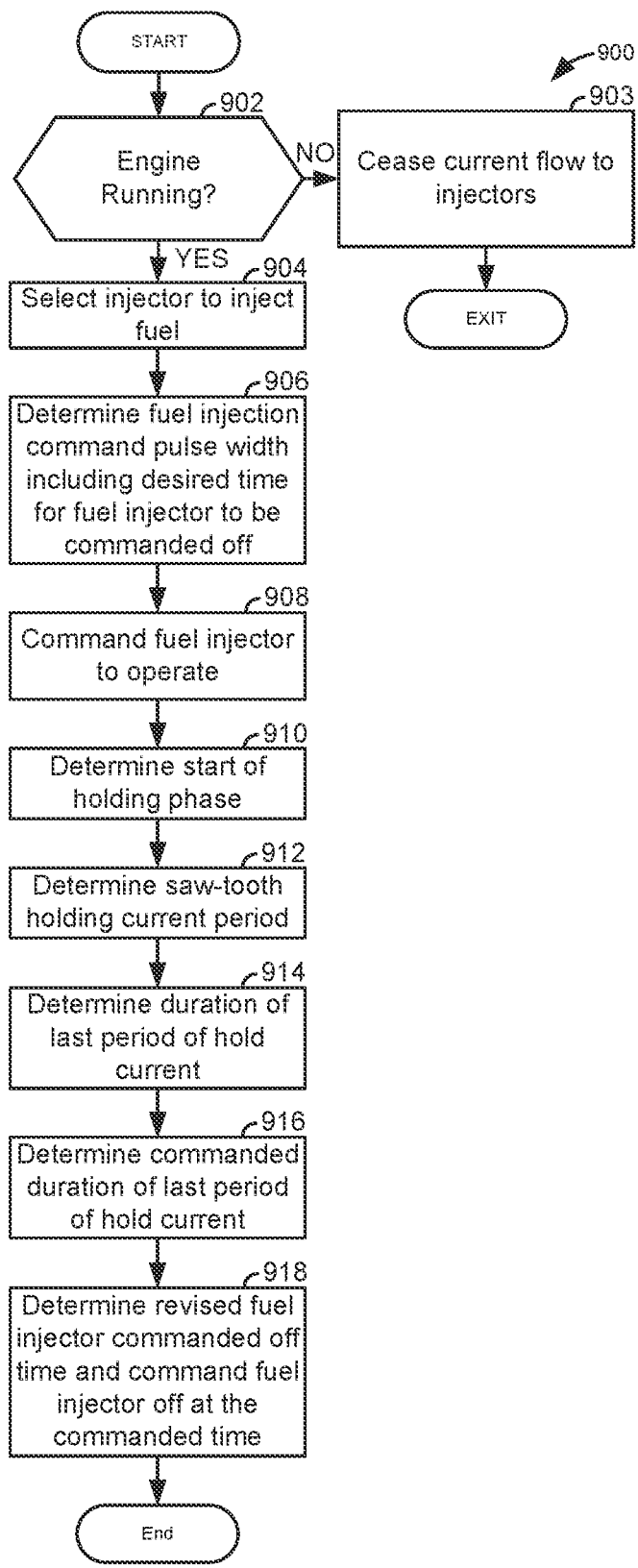
FIG. 9 shows an example method for operating fuel injectors.

The present description is related to reducing variability of fuel injected by a fuel injector. Fuel may be directly injected to engine cylinders via direct fuel injectors as shown in FIG. 1. A prior art electric current profile for a fuel injector is shown in FIG. 2. Attributes of fuel injector current are shown in FIGS. 3-5 for the purpose of illustrating how fuel injection timing may compensate for a level of fuel injector holding current at a time when the fuel injector is commanded off so that the fuel injector may deliver a requested amount of fuel. FIGS. 6A-6C show how extra closing time may occur when holding current is present in a fuel injector and how the extra closing time may be the basis for adjusting fuel injection timing. FIGS. 7A and 7B illustrate how extra closing time may influence an amount of fuel that is delivered via a fuel injector. A fuel injector driver circuit is shown in FIG. 8. Finally, a method for operating fuel injectors is shown in FIG. 9. The method of FIG. 9 may adjust fuel injector timing to compensate for an amount of holding current flowing in a fuel injector at a time when the fuel injector is commanded off, which may affect an amount of fuel that is injected by the fuel injector.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 30, which is known to those skilled in the art as direct injection. Port fuel injector 67, injects fuel to intake port 69, which is known to those skilled in the art as port injection. Fuel injector 66 delivers liquid fuel in proportion to a voltage pulse width or fuel injector pulse width of a signal from controller 12. Likewise, fuel injector 67 delivers liquid fuel in proportion to a voltage pulse width or fuel injector pulse width from controller 12. Fuel is delivered to fuel injectors 66 and 67 by a fuel system (not shown) including a fuel tank, fuel pump, and fuel rail (not shown). Fuel is supplied to direct fuel injector 66 at a higher pressure than fuel is supplied to port fuel injector 67. In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsive effort pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may receive input and communicate conditions such as degradation of components to light, or alternatively, human/machine interface 171.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system, comprising: a fuel injector; and a controller including executable instructions stored in non-transitory memory that cause the controller to adjust timing of a fuel injector off command in response to a period of a last period of fuel injector holding current supplied to the fuel injector during a fuel injection event of the fuel injector. The system includes where the fuel injector off command is delivered during the period of the last period of fuel injector holding current supplied to the fuel injector during the fuel injection event of the fuel injector. The system includes where the fuel injection event begins when the fuel injector opens to inject fuel and ends when the fuel injector closes to cease injecting fuel. The system further comprises additional instructions to determine a fuel injector off time based on the period of the last period of fuel injector holding current supplied to the fuel injector during the fuel injection event of the fuel injector. The system includes where fuel injector off command causes the fuel injector to cease injecting fuel. The system includes where the fuel injector off command includes commanding a battery high side switch open and a battery low side switch open. The system includes where the period of the last period of fuel injector holding current is based on a period of holding current during the fuel injection event.

The system of FIG. 1 also provides for a system, comprising: a fuel injector; a battery high side switch and a low side switch; and a controller including executable instructions stored in non-transitory memory that cause the controller to adjust timing of a fuel injector off command in response to a relationship and an inverse of the relationship, the relationship between a commanded fuel injector off pulse width and a desired fuel injector pulse width, where the commanded fuel injector pulse width is based on the desired fuel injector pulse width and an extra time to close the fuel injector. The system includes where the desired fuel injector pulse width is based engine speed and load. The system includes where the extra time is based on an amount of holding current flowing into the fuel injector at a time when the fuel injector is commanded off. The system includes where the fuel injector off command causes the fuel injector to cease injecting fuel. The system includes where the battery high side switch is opened and the low side switch is opened in response to the fuel injector off command.

Referring now to FIG. 2, an electric current profile for a fuel injector is shown. The electric current profile shows electric current flow into a fuel injector while fuel is being injected via the fuel injector. The fuel injector may be a direct fuel injector 66 as shown in FIG. 1. The references to the low side switch, boost high side switch, and the battery high side switch mentioned in the description of FIG. 2 refer to the switches that are shown in FIG. 5.

Plot 200 shows a plot of fuel injector current amount versus time. The vertical axis represents an amount of electric current flowing into a fuel injector and the amount of electric current increases in the direction of the vertical axis arrow. The horizontal axis represents time and time increases from the left side of the plot to the right side of the plot.

At time t0, the amount of electric current flowing into the fuel injector is zero. The fuel injector is fully closed (not shown) and fuel is not flowing through the fuel injector.

At time t1, the fuel injector is commanded to open and a boosted voltage (e.g., 65 volts DC) is applied to the fuel injector (not shown) by closing the boost high side switch. Applying the boosted voltage causes electric current to begin to flow into the fuel injector. This may be referred to as a first boost phase or simply a boost phase during the fuel injection event. Time t1 is also the beginning of the fuel injection event, or the beginning of a time period in which fuel is injected via the fuel injector. The fuel injection event may be a function of a requested amount of fuel to inject to an engine cylinder via a fuel injector. During the boost phase, the battery high side switch and the low side switch are also closed to allow electric current to flow into the fuel injector (not shown).

At time t2, the amount of electric current flowing into the fuel injector reaches a threshold. Therefore, the boost phase is ended so as to allow the amount of electric current flowing into the fuel injector to be reduced. The boost phase is ended by opening the boost high side switch and leaving the battery high side switch closed (not shown). The low side switch also remains closed (not shown).

At time t3, the boosted voltage is applied to the fuel injector a second time, although this application of the boost voltage is optional. The boost high side switch is closed so that the electric current flowing into the fuel injector begins to increase. The battery high side switch and the low side switch remain closed.

At time t4, the amount of electric current flowing into the fuel injector reaches the threshold again. Therefore, the boost phase is ended so as to allow the amount of electric current flowing into the fuel injector to be reduced. The boost phase is ended by opening the boost high side switch and leaving the battery high side switch closed (not shown). The low side switch also remains closed (not shown). The pick-up or recirculation mode begins. In between time t4 and time t5, the battery high side switch may be repeatedly opened and closed. The battery high side switch may be opened if the fuel injector current is not less than a threshold and the battery high side switch may be closed if the fuel injector current is reduced to the threshold. The battery high side switch may remain closed until the fuel injector current exceeds a second threshold current. These actions cause the fuel injector to open without drawing large amounts of electric current.

At time t5, which may be a predetermined amount of time since time t1, the fuel injector is open and the low side switch is opened so that the amount of energy stored in the fuel injector's coil may be reduced via allowing current to flow through a freewheeling diode. The battery high side switch is closed and the boost high side switch is closed. As a result, the amount of electric current that is flowing into the fuel injector may be quickly reduced.

At time t6, the electric current flowing into the fuel injector is reduced to a minimum holding current. The holding phase begins and the freewheeling phase ends at time t6. The low side switch is closed and the battery high side switch is closed so that the amount of electric current flowing into the fuel injector begins to increase toward a maximum holding current. By operating the fuel injector with an electric current that is between the maximum holding current and the minimum holding current, the fuel injector may remain in an open state while consuming little electric energy. While the fuel injector is operated in the holding phase (e.g., between time t6 and commanding the fuel injector to cease injecting fuel at time t9), the amount of electric current flowing through the fuel injector is cycled between a minimum holding current and a maximum holding current. The amount of holding current is cycled from the minimum holding current to the maximum holding current by closing the battery high side switch when the electric current flowing through the fuel injector is less than or equal to the minimum holding current and opening the battery high side switch when the electric current flowing through the fuel injector is equal to or greater than the maximum holding current. The minimum holding current and the maximum holding current are held at constant values during the holding phase. A period (e.g., a saw-tooth period) in which the fuel injector holding current is cycled from the minimum holding current to the maximum holding current is indicated as the amount of time between time t6 and time t8. The fuel injector holding current ramp-up period for the fuel injector period between time t6 and t8 is from time t6 to time t7. The fuel injector holding current ramp-down period for the fuel injector period between time t6 and t8 is from time t7 to time t8. In this example, the total period is an amount of time between a first time when the fuel injector is at a minimum holding current and a second time when the fuel injector is at minimum holding current after the fuel injector is supplied with the maximum holding current after the first time and before the second time.

At time t9, the fuel injector is commanded to cease injecting fuel such that the fuel injector is off or closed. The holding phase is ended when the fuel injector is commanded to cease injecting fuel or off. The fuel injector is commanded to cease injecting fuel or off by opening the low side switch when the battery high side switch and the boost high side switch are open. Energy that is stored in the fuel injector is reduced to zero and current flow through the fuel injector is zero at time t10. Time t10 is also the end of the fuel injection event. The energy that is stored in the fuel injector is dissipated by allowing electric current to flow through a freewheeling diode (as shown in FIG. 5) between time t9 and time t10.

Referring now to FIG. 3, plots that illustrate holding current control for fuel injectors according to the prior art and according to the present method are shown. The plots show how holding current may be controlled during a holding phase of fuel injection once the fuel injector is in an open state. The plots of FIG. 3 are aligned in time. The holding current shown in FIG. 3 is for one fuel injection event (e.g., from time t1 to time t10 shown in FIG. 2).

The first plot from the top of FIG. 3 shows a plot of fuel injector holding current versus time. The vertical axis represents fuel injector holding current and holding current increases in the direction of the vertical axis arrow. The horizontal axis represents time and time increases from the left side of the figure to the right side of the figure. Line 302 represents fuel injector holding current. Dashed line 350 represents a maximum fuel injector holding current threshold and dashed line 352 represents a minimum fuel injector holding current threshold.

The second plot from the top of FIG. 3 shows a plot of extra or additional opening time of a fuel injector after the fuel injector is commanded to cease injecting fuel or off that is based on or that is a function of fuel injector holding current that is flowing through the fuel injector at the time when the fuel injector is commanded to cease injecting fuel. The vertical axis represents the extra opening time of the fuel injector and the extra opening time increases in the direction of the vertical axis arrow. The horizontal axis represents time and time increases from the left side of the figure to the right side of the figure. Line 304 represents the extra opening time of the fuel injector that is related to the fuel injector holding current. Dashed line 354 represents the extra opening time for the fuel injector when the fuel injector is commanded off at time $t_{off}$.

The fuel injector is open before time $t_{0,hold}$ and fuel injector holding current begins to flow through the fuel injector at time $t_{0,hold}$, which is the start of the fuel injector holding phase. The fuel injector is commanded off (e.g., cease flowing fuel through the fuel injector) at time $t_{off}$. The period of the saw-tooth wave form 360 of the holding current is indicated by leader 320. The ramping up time of the period 320 or $T_{ON}$ is indicated by leader 322. The battery high side switch is closed and the low side switch is closed during the ramping up time so that current flow into the fuel injector increases during the ramping up time. The ramping down time of the period 320 or $T_{RECIRC}$ is indicated by leader 324. The battery high side switch is open and the low side switch is closed during the ramping down time so that current flow into the fuel injector decreases during the ramping down time. The amount of time between when the fuel injector is commanded off and a time where the holding current is equal to the minimum holding current is indicated at 308. The time at 308 may be referred to as extra time or $T_{EXTRA}$.

Thus, FIG. 3 shows three full periods of fuel injector holding current and one partial period of fuel injector holding current. The amount of time that holding current is present may be a function of the amount of fuel that is requested to be injected via the fuel injector.

Referring now to FIG. 4, the two plots shown in FIG. 4 are the same as the two plots shown in FIG. 3. Therefore, for the sake of brevity the description of the plots is not repeated. FIG. 4 indicates the fuel injection holding time or period via leader 402. The holding time may be expressed via the following equation: $T_{HOLD} = t_{OFF} - t_{0,HOLD}$ where $T_{HOLD}$ is the fuel injector holding current time, $t_{OFF}$ is the time where the fuel injector is commanded off or to cease injecting fuel, and $t_{0,HOLD}$ is the time where the fuel injector holding phase begins (e.g. a phase where fuel injector current is constrained to be less than a maximum fuel injector holding current and more than a minimum fuel injector holding current).

Turning now to FIG. 5, the two plots shown in FIG. 5 are the same as the two plots shown in FIG. 3. Therefore, for the sake of brevity the description of the plots is not repeated. FIG. 5 indicates the time of the last period of fuel injector holding current in the fuel injection holding time or period via leader 502. The time duration of the last period in the fuel injection holding phase or period may be expressed via the following equation:

$$T_{LP} = T_{HOLD} - \left\lfloor \frac{T_{HOLD}}{T_{ST}} \right\rfloor T_{ST}$$

where $T_{HOLD}$ is the fuel injector holding current time, $T_{LP}$ is amount of time in the last period of the holding phase, and $T_{ST}$ is the period of the saw-tooth wave form in the holding period (as indicated by leader 320). The brackets H indicate that the result of $T_{HOLD}/T_{ST}$ is rounded down to the nearest integer and it may be referred to as a floor function.

Referring now to FIG. 6A, a plot of a relationship between time during one period of holding current (e.g., time 320 in FIG. 3) and extra holding time due to fuel injector holding current flowing through the fuel injector is shown. The vertical axis represents the additional or extra amount of time that a fuel injector stays open after being commanded off or to cease flowing fuel. The extra amount of time increases in the direction of the vertical axis arrow. The horizontal axis represents time during a period of fuel injector holding current (e.g., 320 of FIG. 3) and the amount of time increases in the direction of the horizontal axis arrow.

Leader 640 represents the period $T_{ST}$ of the fuel injector holding current saw-tooth wave form and it starts at time 0 and it ends at time $T_{ST}$. Leader 642 represents a time during period $T_{ST}$ where the fuel injector holding current is increasing due to battery voltage being applied to the fuel injector via closing the battery high side switch while the low side switch is also closed. Leader 644 represents a time during period $T_{ST}$ where the fuel injector holding current is decreasing due to battery voltage not being applied to the fuel injector via opening the battery high side switch while the low side switch is closed. The value of curve 602 is zero at location 650 (0 (horizontal axis value),0 (vertical axis value)) and at location 652 ($T_{ST}$,0). Thus, it may be observed that the amount of extra time for closing the fuel injector increases during ramping up time 642 and it decreases during the ramping down time 644.

Referring now to FIG. 6B, a plot of a relationship or transfer function between time of a commanded last period of a fuel injector holding current period $T_{LP,commanded}$ and an effective time of the commanded last period of the fuel injector holding current period $T_{LP,eff}$ is shown. The effective time of the commanded last period of fuel injection holding current period may be expressed as: $T_{LP,eff} = T_{LP,commanded} + T_{EXTRA}$, where $T_{LP,eff}$ is the effective time of the last period of the fuel injector holding current period, $T_{LP,commanded}$ is the time of the commanded last period of the fuel injector holding current period and $T_{EXTRA}$ is the extra amount of time for the fuel injector to close due to the amount of holding current flowing through the fuel injector.

Solid line 604 represents the relationship between time of a commanded last period of a fuel injector holding current period $T_{LP,commanded}$ and an effective time of the commanded last period of the fuel injector holding current period $T_{LP,eff}$. Dashed line 606 represents the relationship between time of a commanded last period of a fuel injector holding current period $T_{LP,commanded}$ and an effective time of the commanded last period of the fuel injector holding current period $T_{LP,eff}$ if the value of $T_{EXTRA}$ was zero. It may be observed that for a given time in the commanded last period of fuel injector holding current period $T_{LP,commanded}$, the effective fuel injector holding current period $T_{LP,eff}$ value is greater than the value of the commanded last period of fuel injector holding current period $T_{LP,commanded}$, except at the end points 654 and 656 where they are equal. The curve 604 is (0,0) as indicated at 654 and it is at $(T_{ST}, T_{ST})$ as indicated at 656. The relationship shown in FIG. 6B may be determined by commanding the fuel injector to close at different holding current levels during a last period of fuel injector holding current during a fuel injection event and recording the extra time to close the fuel injector. The added time to close the fuel injector may be added to the time of the last period of the holding current to determine the effective period of the last period of the fuel injector holding current.

Referring now to FIG. 6C, a plot of a relationship or transfer function between time of a the effective time of the commanded last period of the fuel injector holding current period $T_{LP,eff}$ and the commanded last period of a fuel injector holding current period $T_{LP,commanded}$ is shown. Thus, the plot of 6C is the inverse transfer function of the plot of FIG. 6B. The relationship shown in FIG. 6C may be determined by interchanging the variables of the horizontal and vertical axes of the plot shown in FIG. 6B.

Solid line 610 represents the inverse relationship between time of a commanded last period of a fuel injector holding current period $T_{LP,commanded}$ and an effective time of the commanded last period of the fuel injector holding current period $T_{LP,eff}$. Dashed line 608 represents the relationship between an effective time of the commanded last period of the fuel injector holding current period $T_{LP,eff}$ and time of a commanded last period of a fuel injector holding current period $T_{LP,commanded}$ if the value of $T_{EXTRA}$ was zero. The curve 610 is (0,0) as indicated at 658 and it is at $(T_{ST}, T_{ST})$ as indicated at 660.

Moving on to FIG. 7A, a plot 700 of a relationship or transfer function between a commanded fuel injector pulse width and an actual fuel injector pulse width is shown. The vertical axis of plot 700 represents the fuel injector's actual fuel pulse width and the fuel injector's actual pulse width increases in the direction of the vertical axis arrow. The horizontal axis of plot 700 represents the commanded fuel injector pulse width and the commanded fuel pulse width increases in the direction of the horizontal axis arrow. Solid line 702 represents the relationship or transfer function between a commanded fuel injector pulse width and an actual fuel injector pulse width. Solid line 702 is the commanded fuel injector pulse width plus the extra time shown in FIGS. 3-5, where the extra time varies according to a time when the fuel injector is commanded off. Dashed line 704 would represent a relationship or transfer function between a commanded fuel injector pulse width and an actual fuel injector pulse width if the commanded fuel injector pulse width resulted in an equal actual fuel injector pulse width.

It may be observed that the rate of change of the actual fuel injector pulse width increases and decreases as the commanded fuel injector pulse width increases. Therefore, a commanded fuel injector pulse width may result in a same or nearly same actual fuel pulse width for some commanded fuel injector pulse widths. However, the commanded fuel injector pulse width may result in larger actual fuel pulse widths for some commanded fuel injector pulse widths. The actual fuel injector pulse width may be looked up as a function of the commanded fuel injector pulse width.

Referring now to FIG. 7B, a plot 750 of a relationship or transfer function between an actual fuel injector pulse width and a commanded fuel injector pulse width and is shown. One objective is for the actual fuel injector pulse width to equal the desired fuel injector pulse width, so the actual fuel injector pulse width and the desired fuel injector pulse width may be viewed as the same in this context. Therefore, it follows that the relation from the commanded fuel injection pulse width to the actual fuel injection pulse width is the inverse of the relation from the desired fuel injection pulse width to the commanded fuel injection pulse width.

The vertical axis of plot 700 represents the commanded fuel injector pulse width and the commanded fuel pulse width increases in the direction of the vertical axis arrow. The horizontal axis of plot 700 represents the fuel injector's desired fuel pulse width and the fuel injector's desired pulse width increases in the direction of the horizontal axis arrow. Solid line 708 represents the relationship or transfer function between a desired fuel injector pulse width and a commanded fuel injector pulse width. Solid line 708 is the commanded fuel injector pulse width minus the extra time shown in FIGS. 3-5, where the extra time varies according to a time when the fuel injector is commanded off. Dashed line 706 would represent a relationship or transfer function between a desired fuel injector pulse width and a commanded fuel injector pulse width if the desired fuel injector pulse width resulted in an equal commanded fuel injector pulse width.

It may be observed that the rate of change of the commanded fuel injector pulse width increases and decreases as the desired fuel injector pulse width increases. Therefore, a desired fuel injector pulse width may result in a same or nearly same commanded fuel pulse width for some desired fuel injector pulse widths. However, the desired fuel injector pulse width may result in smaller commanded fuel pulse widths for some desired fuel injector pulse widths. The commanded fuel injector pulse width may be looked up as a function of the desired fuel injector pulse width. FIGS. 7A and 7B are equivalent to FIGS. 6B and 6C if the relation and inverse relation are provided for the whole fuel injection pulse width instead of only for the last period of the holding current.

Referring now to FIG. 8, an example electrical circuit 800 for operating a fuel injector is shown. A similar electrical circuit 800 may be provided for each fuel injector and the electrical circuit of FIG. 8 may be included in the system of FIG. 1, in controller 12 for example.

Circuit 800 includes a boosted power supply 802 that outputs a first voltage (e.g., 65 volts—a boosted voltage) and a battery 804 that outputs battery voltage (e.g., 12 volts). The boosted voltage may be selectively electrically coupled to fuel injector coil 812 to activate the fuel injector and begin fuel delivery from the fuel injector to an engine. The boosted voltage may be applied to the fuel injector coil 812 via boost high side switch 806. Boost high side switch 806 may be a transistor such as a field effect transistor, bipolar transistor, or other known transistor. Boost high side switch 806 may be closed to apply the boosted voltage to the fuel injector coil 812.

The battery voltage may also be selectively electrically coupled to fuel injector coil 812 to hold open the fuel injector and continue fuel delivery from the fuel injector to an engine. The battery voltage may be applied to the fuel injector coil 812 via battery high side switch 808. Battery high side switch 808 may be a transistor such as a field effect transistor, bipolar transistor, or other known transistor. Battery high side switch 808 may be closed to apply the battery voltage to the fuel injector coil 812. Switches 806 and 808 may referred to high side switches since they are located closer to the higher potential sides of battery 804 and boosted power supply 802.

Circuit 800 also includes a freewheel diode 810 that allows electrical current to flow through the freewheel diode and to fuel injector coil when current flow from the boosted high side switch or from the battery high side switch to the fuel injector coil 816 is interrupted. Circuit 800 also includes a Zener diode 816 that includes a threshold breakdown voltage (e.g., 65 volts). Finally, circuit 800 includes a low side switch 814 that may be closed to activate the fuel injector and opened to deactivate the fuel injector. The circuit of FIG. 8 may be included in the controller of FIG. 1 or it may be electrically coupled to the controller of FIG. 1.

Thus, the system of FIGS. 1 and 8 provides for a system, comprising: a fuel injector; and a controller including executable instructions stored in non-transitory memory that cause the controller to adjust timing of a fuel injector off command in response to a period of a last period of fuel injector holding current supplied to the fuel injector during a fuel injection event of the fuel injector. The system includes where the fuel injector off command is delivered during the period of the last period of fuel injector holding current supplied to the fuel injector during the fuel injection event of the fuel injector. The system includes where the fuel injection event begins when the fuel injector opens to inject fuel and ends when the fuel injector closes to cease injecting fuel. The system further comprises additional instructions to determine a fuel injector off time based on the period of the last period of fuel injector holding current supplied to the fuel injector during the fuel injection event of the fuel injector. The system includes where fuel injector off command causes the fuel injector to cease injecting fuel. The system includes where the fuel injector off command includes commanding a battery high side switch open and a battery low side switch open. The system includes where the period of the last period of fuel injector holding current is based on a period of holding current during the fuel injection event.

The system of FIGS. 1 and 8 also provides for a system, comprising: a fuel injector; a battery high side switch and a low side switch; and a controller including executable instructions stored in non-transitory memory that cause the controller to adjust timing of a fuel injector off command in response to a relationship and an inverse of the relationship, the relationship between a commanded last period of fuel injector holding current in a holding phase of a fuel injector and a desired last period of fuel injector holding current in the holding phase. The system includes where the desired last period is based on the commanded last period plus an extra time for the fuel injector to close. The system includes where the extra time is based on an amount of holding current flowing into the fuel injector at a time when the fuel injector is commanded off. The system includes where the fuel injector off command causes the fuel injector to cease injecting fuel. The system includes where the battery high side switch is opened and the low side switch is opened in response to the fuel injector off command.

Referring now to FIG. 9, a method for operating a fuel injector is described. The method of FIG. 9 may be incorporated into the system of FIGS. 1 and 8 as executable instructions stored in non-transitory memory. The method of FIG. 9 may cause the controller of FIG. 1 to receive inputs from one or more sensors described herein and adjust positions or operating states of one or more actuators described herein in the physical world. The switches, diodes, and fuel injectors mentioned in the description of FIG. 9 may be included in a circuit as described in FIG. 8. Method 900 may be performed for each of the engine's fuel injectors.

At 902, method 900 judges whether or not the engine is running (e.g., rotating and combusting fuel). If so, the answer is yes and method 900 proceeds to 904. Otherwise, the answer is no and method 900 proceeds to 903. In one example, method 900 may judge that the engine is running if fuel is being injected to the engine and engine speed is greater than a threshold speed.

At 903, method 900 ceases current flow to the engine's fuel injectors. Fuel flow from the fuel injectors may be ceased via opening a boost high side switch, open a battery high side switch, and opening a low side switch. Method 900 proceeds to exit.

At 904, method 900 selects a fuel injector for injecting fuel to the engine. The fuel injector may be selected according to the engine's firing order. For example, if the engine is a four cylinder engine with a firing order of 1-3-4-2, method may select the fuel injector of cylinder number three to inject fuel after the fuel injector for cylinder number one has started injecting fuel. Method 900 proceeds to 906.

At 906, method 900 determines a fuel injection command pulse width (e.g., a time duration of an electric signal that is supplied to a fuel injector driver circuit to open and close a fuel injector). In one example, method 900 determines a fuel pulse width according to a driver demand torque that is determined from a position of a propulsive effort pedal and engine speed. The propulsive effort pedal position and engine speed may be applied to generate a torque request for the engine and the torque request for the engine may be converted to a torque request for the selected cylinder. A cylinder air amount may be determined via a lookup table from the torque request, and a cylinder fuel amount or requested fuel injection amount may be determined via dividing the cylinder air amount by a requested cylinder air-fuel ratio. The cylinder fuel amount may be converted into a fuel injector pulse width via a function that outputs empirically determined fuel injector pulse width values when it is referenced via a cylinder fuel amount. The start of injection timing may also be based on engine speed and load and it may be determined from empirically determined values that are stored in a table or function that may be referenced or indexed via engine speed and load. The fuel injector on time may begin at zero seconds and the initial fuel injector off time may be the fuel injector on time plus the fuel injector pulse width that was determined from the function that outputs fuel injector pulse width when referenced by the cylinder fuel amount. Method 900 proceeds to 908.

At 908, method 900 commands the fuel injector to operate. In one example, method 900 applies a boost voltage to a selected fuel injector that is to deliver fuel to an engine cylinder during a cycle of an engine. Thus, the injection period for the selected fuel injector begins. In one example, the boost voltage is applied to the fuel injector via closing a boost high side switch while a low side switch and a battery high side switch are also closed. The boost voltage may be 65 volts and the battery voltage may be 12 volts. By applying the boost voltage to the selected fuel injector, the selected fuel injector may open at a faster rate as compared to if battery voltage were applied to the selected fuel injector. Method 900 also recirculates current in the fuel injector after the boost phase is activated for a predetermined amount of time via opening the boost high side switch and flowing current through a freewheeling diode (as shown in FIG. 8) via opening the boost high side switch while the battery high side switch is closed and while the low side switch is closed. By recirculating current to the fuel injector, generation of large voltage spikes may be prevented. The current may be recirculated for a predetermined amount of time.

Method 900 reduces the electric current that is flowing through the selected fuel injector to the minimum hold current threshold value. The fuel injector holding phase begins and the boost phase ends when the fuel injector current is reduced to the minimum holding current threshold value. In some examples, method 900 may generate two boost phases before entering the holding current phase. In one example, method 900 may open the low side switch to reduce the amount of electric current that is flowing through the selected fuel injector to the minimum hold current. The boost high side switch may remain open and the battery high side switch may remain closed. Method 900 applies battery voltage to the selected fuel injector so as to increase fuel injector holding current toward a maximum holding current after the fuel injector holding current reaches the minimum holding current threshold. The battery voltage may be applied to the selected fuel injector by closing the battery high side switch.

Method 900 begins to recirculate electric current in the selected fuel injector when the selected fuel injector current reaches the fuel injector maximum holding current. Method 900 may begin recirculating current via opening the low side switch. By opening the low side switch, current may flow through the freewheeling diode. Method 900 continues to be in a recirculating mode until the electric current in the fuel injector is reduced to the minimum fuel injector holding current. Method 900 applies the battery voltage to the fuel injector once the fuel injector holding current reaches the threshold minimum holding current. Method 900 cycles fuel injector holding current between the minimum fuel injector holding current and the maximum fuel injector holding current up to a time when the fuel injector is commanded to cease injecting fuel.

At 910, method 900 determines a timing of the start of the fuel injector holding phase. Method 900 may determine the timing of start of the fuel injection holding phase for the last most recent injection by the fuel injector or for the present fuel injection for the selected fuel injector. The timing of the start of the fuel injector holding phase is when the fuel injector current is reduced to the minimum fuel injector holding current immediately following the boost phase. The start of the holding phase is indicated in FIG. 3 as time $t_{0,hold}$. Method 900 proceeds to 912.

At 912, method 900 determines the saw-tooth holding current period. The saw-tooth holding current period is indicated by leader 320 in FIG. 3. In one example, method 900 may determine the saw-tooth period by measuring the time it takes for the fuel injector holding current to move from the minimum fuel injector holding current to the maximum fuel injector holding current and return to the minimum fuel injector holding current. Method 900 proceeds to 914.

At 914, method 900 determines a desired duration of a last period of fuel injector holding current for a fuel injection event before the last period of fuel injector holding current begins. The desired duration of the last period of the fuel injector holding current is the duration that provides the requested amount of fuel to be injected by the fuel injector. In one example, method 900 determines the time duration of the last period in the fuel injection holding phase or period via the following equation:

$$T_{LP,desired} = t_{OFF,desired} - t_{0,HOLD} - \left\lfloor \frac{t_{OFF,desired} - t_{0,HOLD}}{T_{ST}} \right\rfloor T_{ST}$$

where $T_{LP,desired}$ is the desired time duration of the last period of fuel injector hold current during the present fuel injection event, $t_{OFF,desired}$ is the fuel injector hold current off time as determined at 906, $t_{0,HOLD}$ is the initial or starting time of the fuel injector holding current as determined at 910, and $T_{ST}$ is the period of the fuel injector holding current saw-tooth waveform as determined at 912. Recall that $T_{HOLD}=t_{OFF,desired}-t_{0,HOLD}$. Method 900 proceeds to 916.

At 916, method 900 determines a commanded duration of the last period of fuel injector holding current for the present fuel injection event. The commanded duration of the last period is a duration of the last period of the holding phase of the present fuel injection that is corrected for holding current at the time that the selected fuel injector is commanded off. In one example, the commanded duration of the last period may be determined from the desired duration of the last period of the fuel injector holding current via the relation of FIG. 6C.

In some examples, the period of the last period of the fuel injector holding current in the present fuel injection event may be determined via an inverse transfer function of the form: $T_{LP,commanded}$=1D-linear interpolation$([0,T_{ON}+g(I_{MAX}),T_{ST}],[0,T_{ON},T_{ST}],T_{LP,desired})$, where g is a function that returns $T_{EXTRA}$ based on the maximum fuel injector holding current $I_{MAX}$, $T_{ON}$ is the ramping up period (e.g., 322 of FIG. 3 or $T_{ON}$ from FIGS. 6A and 6B), and $T_{ST}$ is the period of the saw-tooth fuel injector holding current. Method 900 proceeds to 918.

At 918, method 900 determines the revised commanded fuel injector off time. The adjusted or revised fuel injector off time that compensates for fuel injector holding current at the time the fuel injector is commanded off may then be computed from the commanded last period of the commanded fuel injection hold current via solving the following equation:

$$T_{LP,commanded} = t_{OFF,commanded} - t_{0,HOLD} - \left\lfloor \frac{t_{OFF,commanded} - t_{0,HOLD}}{T_{ST}} \right\rfloor T_{ST},$$

where $T_{LP,commanded}$ is the commanded revised time duration of the last period of fuel injector holding current during a fuel injection event (e.g., a time when fuel is being injected via a fuel injector), $t_{OFF,commanded}$ is the adjusted or revised fuel injector off time that compensates for fuel injector holding current at the time the fuel injector is commanded off, $t_{0,HOLD}$ is the starting time of the fuel injector holding current for the present fuel injection event, and $T_{ST}$ is the period of the saw-tooth fuel injector holding current as determined at 912. It may be observed that the equation relating the commanded revised time duration to the adjusted or revised fuel injector off time that compensates for fuel injector holding current at the time the fuel injector is commanded off may be simplified based on:

$$0 \leq T_{LP,commanded} \leq T_{ST} \Rightarrow \left\lfloor \frac{t_{OFF,commanded} - t_{0,HOLD}}{T_{ST}} \right\rfloor = \left\lfloor \frac{t_{OFF,desired} - t_{0,HOLD}}{T_{ST}} \right\rfloor.$$

Therefore, $$T_{LP,commanded} = t_{OFF,commanded} - t_{0,HOLD} - \left\lfloor \frac{t_{OFF,desired} - t_{0,HOLD}}{T_{ST}} \right\rfloor T_{ST}.$$

Method 900 may determine the revised commanded fuel injector off time via rearranging the $T_{LP,commanded}$ equation mentioned above along with incorporating the noted simplifications via the following equation:

$$t_{OFF,commanded} = T_{LP,commanded} + t_{0,HOLD} + \left\lfloor \frac{t_{OFF,desired} - t_{0,HOLD}}{T_{ST}} \right\rfloor T_{ST}.$$

The value of the starting time of the fuel injection holding phase time period may be determined as described at 910. The desired fuel injector off time may be determined as described at step 906 and the period of the saw-tooth fuel injector holding current may be determined as described at step 912. Method 900 commands the fuel injector off and to cease injecting fuel at the time $t_{OFF,commanded}$. Method 900 proceeds to exit.

In this way, method 900 may determine a desired fuel injector off time and fuel injection duration. Method 900 may also modify the desired fuel injector off time for the amount of holding current expected to be flowing through the fuel injector when the fuel injector is commanded off to generate a commanded fuel injector off time. The commanded fuel injection off time may cause the fuel injector to inject an amount of fuel that is closer to the requested fuel injection amount so that variation of an amount of fuel injected may be reduced.

Thus, method 900 provides for a method for operating a fuel injector, comprising: adjusting a commanded off time of a fuel injector via a controller in response to a relationship between a commanded last period of fuel injector holding current in a holding phase of a fuel injector and a desired last period of fuel injector holding current in the holding phase. The method includes where the desired last period is based on the commanded last period plus an extra time for the fuel injector to close. The method includes where the extra time is based on an amount of holding current flowing into the fuel injector at a time when the fuel injector is commanded off. The method includes where the commanded off time is a time when the fuel injector is commanded to cease injecting fuel. The method further comprises estimating the commanded last period based on the desired last period and the relationship and an inverse of the relationship. The method further comprises estimating the commanded off time based on the commanded last period, a desired fuel injector off time, and a starting time of the fuel injector holding phase. The method includes where the desired fuel injector off time is based on a requested amount of fuel to inject to an engine, and where the desired last period is estimated based on the desired fuel injector off time and the starting time of a fuel injector holding phase. The method includes where the fuel injector is open and injecting fuel during the holding phase.

In another representation, method 900 provides for a method for operating a fuel injector, comprising adjusting timing of a fuel injector off command in response to a relationship, the relationship between a commanded fuel injector off pulse width and a desired fuel injector pulse width, where the commanded fuel injector pulse width is based on the desired fuel injector pulse width and an extra time to close the fuel injector. The method includes where the extra time to close the fuel injector is an amount of time that is based on fuel injector holding current.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A system, comprising:
  a fuel injector; and
  a controller including executable instructions stored in non-transitory memory that cause the controller to adjust timing of a fuel injector off command in response to a period of a last period of fuel injector holding current supplied to the fuel injector during a fuel injection event of the fuel injector.

2. The system of claim 1, where the fuel injector off command is delivered during the period of the last period of fuel injector holding current supplied to the fuel injector during the fuel injection event of the fuel injector.

3. The system of claim 1, where the fuel injection event begins when the fuel injector opens to inject fuel and ends when the fuel injector closes to cease injecting fuel.

4. The system of claim 1, further comprising additional instructions to determine a fuel injector off time based on the period of the last period of fuel injector holding current supplied to the fuel injector during the fuel injection event of the fuel injector.

5. The system of claim 4, where fuel injector off command causes the fuel injector to cease injecting fuel.

6. The system of claim 5, where the fuel injector off command includes commanding a battery high side switch open and a battery low side switch open.

7. The system of claim 1, where the period of the last period of fuel injector holding current is based on a period of holding current during the fuel injection event.

8. A method for operating a fuel injector, comprising:
  adjusting a commanded off time of the fuel injector via a controller in response to a relationship between a commanded last period of fuel injector holding current in a holding phase of the fuel injector and a desired last period of fuel injector holding current in the holding phase.

9. The method of claim 8, where the desired last period is based on the commanded last period plus an extra time for the fuel injector to close.

10. The method of claim 9, where the extra time is based on an amount of holding current flowing into the fuel injector at a time when the fuel injector is commanded off.

11. The method of claim 8, where the commanded off time is a time when the fuel injector is commanded to cease injecting fuel.

12. The method of claim 8 further comprising estimating the commanded last period based on the desired last period and the relationship and an inverse of the relationship.

13. The method of claim 12, further comprising estimating the commanded off time based on the commanded last period, a desired fuel injector off time, and a starting time of the holding phase.

14. The method of claim 13, where the desired fuel injector off time is based on a requested amount of fuel to inject to an engine, and where the desired last period is estimated based on the desired fuel injector off time and the starting time of a fuel injector holding phase.

15. The method of claim 8, where the fuel injector is open and injecting fuel during the holding phase.

16. A system, comprising:
a fuel injector;
a battery high side switch and a low side switch; and
a controller including executable instructions stored in non-transitory memory that cause the controller to adjust timing of a fuel injector off command in response to a relationship and an inverse of the relationship, the relationship between a commanded fuel injector off pulse width and a desired fuel injector pulse width, where the commanded fuel injector pulse width is based on the desired fuel injector pulse width and an extra time to close the fuel injector.

17. The system of claim 16, where the desired fuel injector pulse width is based on a requested amount of fuel to inject to an engine.

18. The system of claim 16, where the extra time is based on an amount of holding current flowing into the fuel injector at a time when the fuel injector is commanded off.

19. The system of claim 16, where the fuel injector off command causes the fuel injector to cease injecting fuel.

20. The system of claim 16, where the battery high side switch is opened and the low side switch is opened in response to the fuel injector off command.

* * * * *